Figure 1:
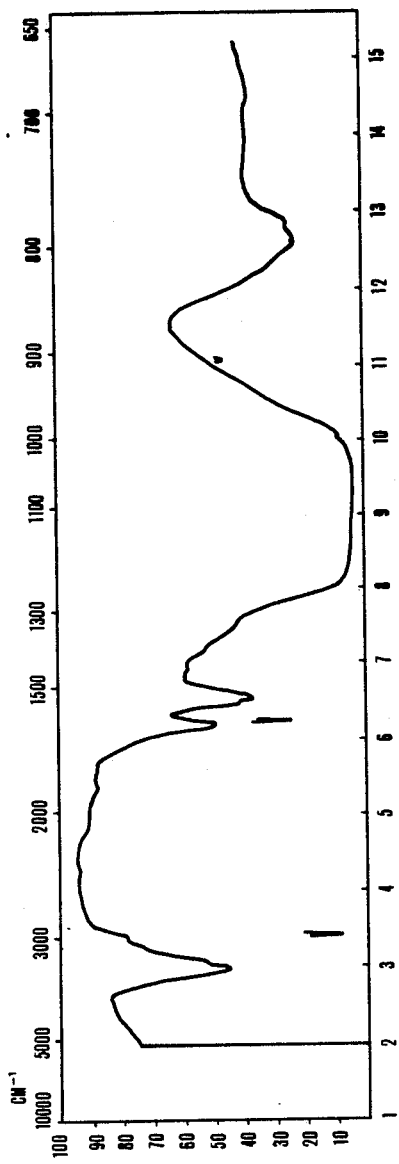

_United States Patent_ [19]

Oda et al.

[11] 3,892,709

[45] July 1, 1975

[54] ALDEHYDE-POLYAMINE OR ALDEHYDE-POLYAMINE- AROMATIC COMPOUND CONDENSATION RESIN ADSORBENT FOR HEAVY METALS AND HEAVY METALLIC COMPOUNDS

[75] Inventors: Nakaaki Oda; Shozo Iwasa; Mitsuru Idohara; Yoshio Horie; Takeo Fukui; Naomichi Takasaka, all of Takaoka, Japan

[73] Assignee: Nippon Soda Company, Limited, Japan

[22] Filed: Dec. 14, 1973

[21] Appl. No.: 424,680

Related U.S. Application Data

[62] Division of Ser. No. 209,573, Dec. 20, 1971, abandoned.

[52] U.S. Cl.................. 260/39 R; 106/90; 252/428
[51] Int. Cl............................................. C08g 51/04
[58] Field of Search....... 260/51.5, 59, 38; 252/428; 106/90

[56] References Cited
UNITED STATES PATENTS

| | | | |
|---|---|---|---|
| 1,767,514 | 6/1930 | Dalen................................. | 252/428 |
| 2,228,514 | 1/1941 | Greissbach et al. .................. | 260/59 |
| 2,402,384 | 6/1946 | Eastes............................. | 260/51.5 X |
| 2,585,196 | 2/1952 | Walton ........................ | 260/51.5 X |
| 2,671,059 | 3/1954 | Smit................................ | 260/51.5 X |
| 2,731,425 | 1/1956 | Juda et al. ...................... | 260/51.5 X |
| 3,089,885 | 5/1963 | Kruse............................. | 260/53 R X |
| 3,240,736 | 3/1966 | Beckwith ...................... | 260/40 R X |
| 3,664,215 | 2/1972 | Muller ............................ | 252/428 X |
| 3,666,703 | 5/1972 | Murata et al. .................... | 260/38 X |
| 3,674,705 | 7/1972 | Hytrek............................ | 252/428 X |

_Primary Examiner_—Melvyn I. Marquis
_Assistant Examiner_—S. M. Person
_Attorney, Agent, or Firm_—George B. Oujevolk

[57] ABSTRACT

This invention relates to novel aldehyde-polyamine or aldehyde-polyamine-aromatic comdensation resin adsorbents for heavy metals and heavy metallic compounds.

14 Claims, 11 Drawing Figures

ALDEHYDE-POLYAMINE OR ALDEHYDE-POLYAMINE- AROMATIC COMPOUND CONDENSATION RESIN ADSORBENT FOR HEAVY METALS AND HEAVY METALLIC COMPOUNDS

This is a division of application Ser. No. 209,573 filed Dec. 20, 1971, now abandoned.

Ion-exchange resins and activated charcoal have been employed heretofore in the capture or removal of heavy metals and heavy metallic compounds which are present or whch contaminate liquids or gases. However ion-exchange resins can capture ionic compounds but cannot act on non-ionic compounds and moreover the resins hardly have the selectivity of adsorbates. Further, activated charcoal can adsorb both non-ionic and ionic compounds but charcoal likewise has no selectivity of adsorbates. So, ion-exchange resins and activated charcoal are not suited for the capture or removal of heavy metal or heavy metallic compounds from liquids or gases which contain various kinds of materials. It has been thought to be difficult to capture or remove heavy metal or heavy metallic compounds selectively, which exist in an amount on the order of ppm in liquids or gases with other compounds such as non-metallic compounds and light metallic compounds.

Thus, it is an object of this invention to provide an adsorbent which selectively adsorbs heavy metals and heavy metallic compounds.

It is another object of this invention to provide a method to prepare an adsorbent which has a large adsorption capacity.

It is also an object of the invention to provide an economical method to remove or capture heavy metals or heavy metallic compounds from liquids and gases for example service water, drainage or sewage from a factory, laboratory or hospital, air, exhaust gas from cars, which are sometimes contaminated with heavy metals and heavy metallic compounds.

It is still another object of the invention to provide an economical method to prevent surroundings from pollution by heavy metals or heavy metallic compounds.

It is a further object of the invention to provide a method to render waste, which contains heavy metals or heavy metallic compounds, harmless and insoluble and to prevent heavy metals or heavy metallic compounds from exuding.

Other objects of this invention will become apparent from time to time throughout the specification and claims as hereinafter related.

It has been discovered that aldehyde-polyamine or aldehyde-polyamine-aromatic compound condensation resins selectively adsorbs heavy metals such as Cd, Cu, Hg, and Ag, metallic ions thereof, and their metallic compounds.

Aldehyde-polyamine or aldehyde-polyamine-aromatic compound condensation resins can be substantially prepared by condensation reaction between polyamines and aldehydes or polyamines, aldehydes and aromatic compound.

As typical polyamines, diamines and triamines, e.g. melamine, urea, thiourea, rubeanic acid, ethylenediamine, diethylenetriamine, 2,3'-diaminodiphenylsulfide, 3,3'-diaminodiphenyldisulfide, diethylenetriamine, dimercaptophenylenediamine, diaminochloranilic acid, can be employed and preferably polyamine having carbonyl, thiocarbonyl more preferably polyamine having thioureide

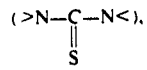

ureide

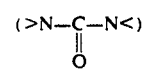

dithioexamide

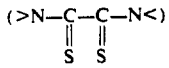

e.g. melamine, urea, thiourea, rubeanic acid are preferably employed and as a typical aldehyde, formaldehyde, acetaldehyde, glyoxal, acrolein, benzaldehyde, furfural can be employed.

As aromatic compounds useful in this invention, an aromatic compound having at least one group selected from the group of consisting of hydroxyl(—OH), thiol- (—SH), amino(—NH$_2$), carboxyl('COOH) and alkali carboxyl (—COOMe wherein Me is sodium or potassium) is used and particularly phenols, thiophenols, naphthols or pyridines, e.g. phenol, thiophenol, naphthol, benzendithiol, o-, m- or p- phydroxybemzcoic acid and sodium or potassium salt thereof, benzoic acid and sodium or potassium salt thereof, cresol, xylenol, resorcimol, toluenethiol, p-hydroxybenzensulfomic acid, benzlhydrazine can be used.

These aromatic compound give the aldehyde-polyamine resin an improved quality for chemical resistance and mechamical strength.

In accordance with the invention, the resin can be prepared by reacting one or more aldehydes and one or more of polyamines, and optionally one or more from the aromatic compounds used in the preparation of aldehyde-polyamine resins.

The reaction ratio of aldehydes and polyamines and if desired aromatic compounds can be chosen freely providing that resinous material can be obtained, however, preferably 0.2–1.0 mole of polyamine or 0.2–1.0 of total mole amount of polyamine and aromatic compound can be employed with 1 mole of aldehyde when the polyamine is diamine, 0.4–0.7 mole of diamine can be preferably employed with 1 mole of aldehyde at the mole ratio. Further when the polyamine is triamine, 0.2–0.7 mole of triamine can be employed with 1 mole of aldehyde as the mole ratio. Also 0.05 to 0.4 mole of an aromatic compound (when aromatic compound is employed), is used for 0.95–0.6 mole of polyamine, and in this case preferably 0.05–0.2 mole of aromatic compound is employed for 0.95–0.8 mole of polyamine as the mole ratio.

Melamine resins, urea resins and thiourea resins which are prepared with melamine and aldehyde, or urea(thiourea) and aldehyde commercially available can be used as the resin of the invention. Additives such as surfactants, foaming agents, colorants etc. can be employed, if desired in the invention.

The resin can be arranged in several forms to suit the desired use, for example, into the shape of beads, foamed plastics, granules or powder etc.

Various means can be employed in order to enlarge the specific surface area ($m^2/g$) of the resin and to heighten the capacity of adsorption. One of the means is to grind or divide the resin into fine powder and another is to foam the resin having open cells in a polycondensation step.

The means employed depend on the properties of the resin and the means may be sometimes very troublesome particularly when the resin is tough and the foamed resin has closed cells (foams).

One of the best means to heighten the capacity of adsorption is to use a carrier which holds the resin in an impregnated state or in the states covering surfaces of the carrier.

The resin with the carrier can be preferably prepared by the following method.

Aldehyde and polyamine or aldehyde, polyamine and aromatic compounds are respectively or simultaneously impregnated into the carrier and made to coexist in the carrier and then a polycondensation reaction is completed in the carrier.

When the aldehyde and polyamine or aldehyde, polyamine and aromatic compound or mixture thereof have not sufficient fluidity to impregnate into the carrier, an appropriate solvent may be employed; preferably water, ketones e.g. acetone, methylethylketone, methylisobutyl ketone, alcohols e.g. methylalcohol ethylalcohol, and tetrahydrofuran can be used.

If desire, the mixture may be slightly polymerized to form a prepolymer in the solution prior to the impregnation, however the polymerization should not be carried out to the extent that a large amount of turbidity appears in the solution.

The impregnation should be carried on in order to contain resin at the amount desired of 0.1 to 100% preferably 5 to 45% by weight to carrier weight and for this purpose, the solution of the mixture is preferably prepared in a concentration from 0.1 to 50% by weight. Ordinary methods, for example, dipping, spraying, are used for the impregnation. In order to facilitate the impregnation, if desired, the carrier may be dried, heated or air in the carrier removed under reduced pressure. After the impregnation, if necessary, excess amount of monomer such as aldehyde, polyamine, and/or aromatic compounds or mixture thereof or prepolymer which exist on the surfaces of the carrier may be rinsed with solvent or may be centrifuged.

The polycondensation can be completed by heating, after the removal of solvent used or by heating and combining the removal of the solvent, at a high temperature preferably at 130° to 230°C for more than about 30 minutes preferably 1 hours to 10 hours so as to increase the adsorption capacity.

As to the carrier, many kinds of materials having a porous structure and wide surfaces can be employed and preferably porous material having large specific surfaces of more than $1m^2/g$ (BET's method by argon gas), for example, diatomaceous earth, pumice stone, zeolite, kaolin, vermiculite, alumina (aluminum oxide), silica gel, coke, activated charcoal, graphite, bentonite, foamed urethane resin having open cell, are used as a carrier if an inorganic carrier is used, the carrier being preferably about 20mm to 0.05mm in diameter.

The reaction can be carried on at more than about 40°C preperably at a temperature of 60° to 120°C with or without a solvent.

A solvent having no activity to the reactants, for example, water, ketones e.g. acetone, methylethylketone, methylisobutyl ketone, alcohols, and tetrahydrofran can be employed. In the reaction, if necessary, alkali such as ammonia water, sodium hydroxide, or potassium hydroxide can be employed as a condensation catalyst in order to control the pH of reaction mexture to about 6–9.

The resin obtained is usually solid.

After the reaction, the resin can be heated to a temperature of more than about 130° to about 230°C and preferably 140° to 170°C in air or 140° to 200°C in inert gas for more than 0.5 hour preferably for 1 to 10 hours and the heating completes the condensation reaction and increases the adsorption activities of the resin.

It is considered that the resin in the invention is denatured by the heating step in which pyrolysis takes place and adsorption of infrared spectrum at $4.79\mu$ (2088 $cm^{-1}$) appears and the adsorption becomes extremely strong according to the progress of the heating.

Further the resin is heated in air, absorptions of infrared spectrum at $6.0\mu$ (1667 $cm^{-1}$) and $6.16\mu$ (1626 $cm^{-1}$) appear with the absorption at $4.79\mu$. Considering that the absorption at $4.79\mu$ is based on isocyanato or thioisicyanato group stretching bond and the absorptions at $6.0\mu$ and $6.16\mu$ are in the carbonyl streching absorption region, the resin is denatured to have isocyanato or thioisocyanato group in the heating step in which pyrolysis occurs to a certain extent.

The resin in carrier is presented in the state following the fine porous structure of the carrier and has large specific surfaces to an extent more than $1.0m^2/g$. The specific surfaces of the carrier may be reduced and the reduction of the surfaces sometimes goes up to 70 to 85% of the un-treated carrier, but it gives no difficulty in the practice of this invention.

When this resin adsorbent is used, various conventional methods for adsorption can be employed, for example, the resin adsorbent is contacted with liquids or gases to be treated in a batchwise operation, packed tower or layer system fluid bed operation etc., and in packed tower or layer system, liquids are ordinarily passed through at a rate of 2 to 30 of SV(space velocity) preferably 5 to 15 of SV and gases are ordinary passed at 2 to 25m/min preferably 5 to 15m/min.

The resin adsorbent in the invention can be further activated by dipping in pure water for several days or by treating with acidic or alkaline aqueous solution.

In this treatment acidic or alkaline aqueous solution having a concentration of 1N to 12N preferably 5N to 10N for 1 to 10 hours can be employed. As an acid or alkali, aqueous solution of mineral acid, e.g. hydrochloric acid, phosphoric acid, sulfuric acid, nitric acid, sulfurous acid, perchloric or inorganic alkali compound e.g. sodium hydroxide, potassium hydroxide, ammonia can be preferably used for dipping and preferably the resin treated is rinsed with water to the extent that the water used for rinsing has a pH of about 4 to 8 preferably 6 to 7.

The resin absorbent can selectively adsorb heavy metal and heavy metallic compounds such as copper, cadmium, silver and mercury paticularly mercury and silver and compound thereof from liquids or gases to under concentrations of 0.01 to 0.001 ppm, even if these heavy metals or metallic compounds exist with other metallic compounds; and the adsorbing ability lasts long and further the capacity is large to the extent that the resin can adsorb 3 to 33% by weight for the resin even if silver compounds and mercuric compounds are nonionic or ionic compounds, e.g. metallic oxides, e.g. HgO, Ag$_2$O, metallic chlorides, e.g. HgCl$_2$, AgCl, metallic complex compounds, e.g. Na$_2$Hg$_2$Cl$_4$, metallic salts, e.g. HgSO$_4$, Hg(NO$_3$)$_2$, Ag$_2$SO$_4$, HgCO$_3$, Ag$_2$CO$_3$, Hg$_2$SO$_4$, HgS, Hg$_2$S, Hg$_2$(NO$_3$)$_2$, organometallic compound, e.g. methylmercury chloride, ethylmercury chloride, phenylmercuric acetate, ethylmercury iodide, methylmercury iodide, ethylmercury bromide, methylmurcury formamide, phenylmecury chloride, diphenylmercury, phenylmecury benzoate.

Further, copper and copper compounds are especially adsorbed by the resin when the functional monomer having

for example, dithiooxamide, is used, even if such metallic compounds are nonionic or ionic, for example, CuSO$_4$, CuCl, Cu(OH)$_2$, CuS, CuO, Cu$_2$S, (CH$_3$COO)$_4$Cu$_2$ and furthermore cadmium and cadmium compounds are especially adsorbed by the resin when the aromatic compound having —SH or —COOMe groups, for example, thiophanol, n-hydroxybenzoic acid, or the sodium salt or potassium salt thereof, is used as a raw material of the resin, even if cadmium compounds are nonionic or ionic, e.g. CdSO$_4$, CdCl$_2$, CdS, CdO, Cu(OH)$_2$.

The resin adsorbent can be used for various purposes; for example, the adsorbent is used for removal of heavy metals and heavy metallic compounds and capture or recovery of heavy metals from liquids and gases e.g. service water, river water, waste water of factory, laboratory or hospital, or from organic solvents or acidic or alkaline aqueous solutions e.g. H$_2$SO$_4$, HCl, NaOH or KOH, which sometimes contains heavy metals, and fixation of heavy metal and heavy metallic compounds.

The resin in this invention has some novel usages besides the conventional usages as an adsorbent. For example, when a slurry or granular wastage containing heavy metals or heavy metallic compounds such as mud containing a mercuric compound by product an electrolysis plant of alkalichloride where mercury cells are sometimes treated by being packed in a concrete box in order to dump in the sea or to bury in the ground, heavy metals or heavy metallic compounds are exuded out through the walls of the concrete box by extraction with water and then pollute the surroundings. In that case mixing resin and the waste at a ratio of 0.1 to 50% of the resin in the waste completely prevents the exudation of harmful heavy metals and heavy metallic compounds and further when the resin is homogeniously mixed in concrete or mortar in an amount of 0.1 to 50% preferably 0.5 to 20% for cement, which is used in the concrete or mortar, the resin checks and prevents heavy metals and heavy metallic compounds from passing through the cement or mortar walls. Moreover solidifying material, which solidifies to be hard, for example, cement e.g. Portland cement, alumina cement, Portland blast, furnace cement, silica cement, or raw material of resin, containing 0.1 to 50% preferably 1 to 20% of the resin adsorbent can be used for packing of harmful heavy metallic component and further, walls or constructions made by such solidifying material prevents heavy metals and heavy metallic compounds from passing through the walls or the constructions such as pipes for drainage.

The effects of the present invention will be shown in the following Examples. All quantities described in this specification and the appended claims as "parts" or "percent" refer to "parts by weight" or "percent by weight" unless expressly stated otherwise.

The accompanying drawings, FIGS. 1 to 11 show spectra recording information in graphic form.

EXAMPLE 1

Preparation of resin:

205 parts of thiourea were mixed with 280 parts of water and then 487 parts of 37% aqueous solution of formaldehyde and 28 parts of phenol were added and dissolved in the mixture. Further, 1.5ml of 5N aqueous solution of potassium hydroxide and 10% of ammonia water were added and the pH of the mixture was adjusted to 7.8–8.0. Then the mixture was reacted at a temperature of 80° to 90°C for 90 minutes and prepolymer of viscous liquid was obtained.

Figure 2:
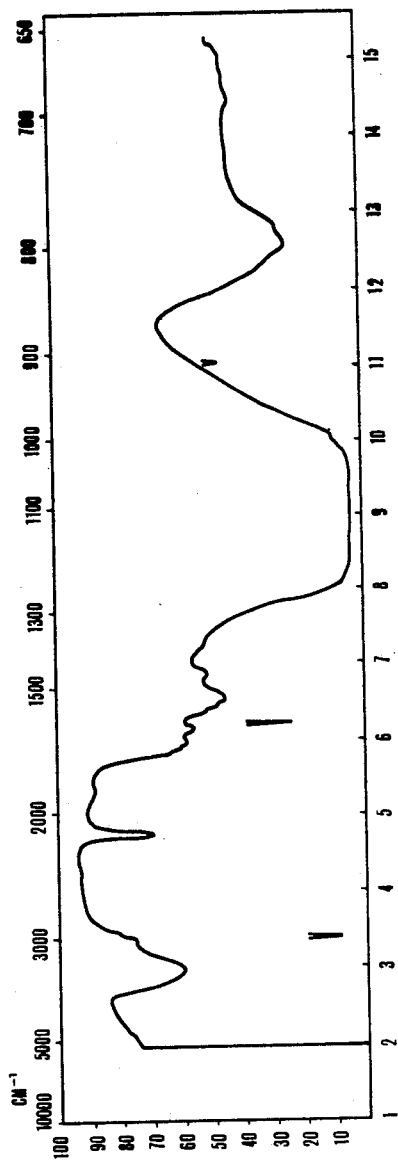

1: Just before the occurance of white turbidity in the reaction mixture, on 100 parts of granules of diatomaceous earth having 10–40 mesh (Tyler) which was dried and degassed by a previous heating, 100 parts of the reaction mixture was sprayed homogeneously. One half of the diatomaceous earth containing the reaction mixture was dried and heated at 150°C for 7 hours in air and adsorbent (A-1) was obtained. The other half cf the diatomaceous earth containing the reaction mixture was dried at 100°C for 15 hours in air and adsorbent (B-1) was obtained. Infrared spectra absorption was taken by KBr method and adsorbent (A-1) showed strong absorption at 4,79$\mu$(2088cm$^{-1}$) as shown in FIG. 2, but adsorbent (B-1) did not show absorption at 4,79$\mu$ as shown in FIG. 1.

Figure 3:
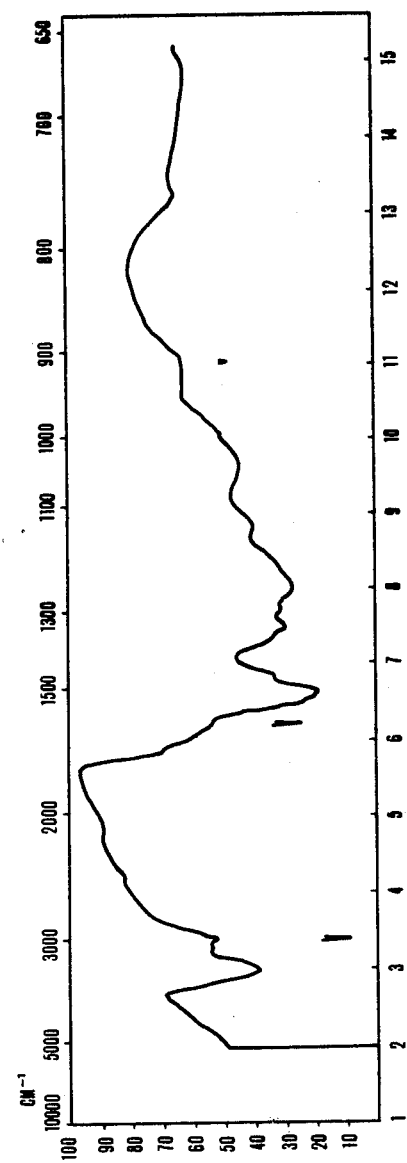
Figure 5:
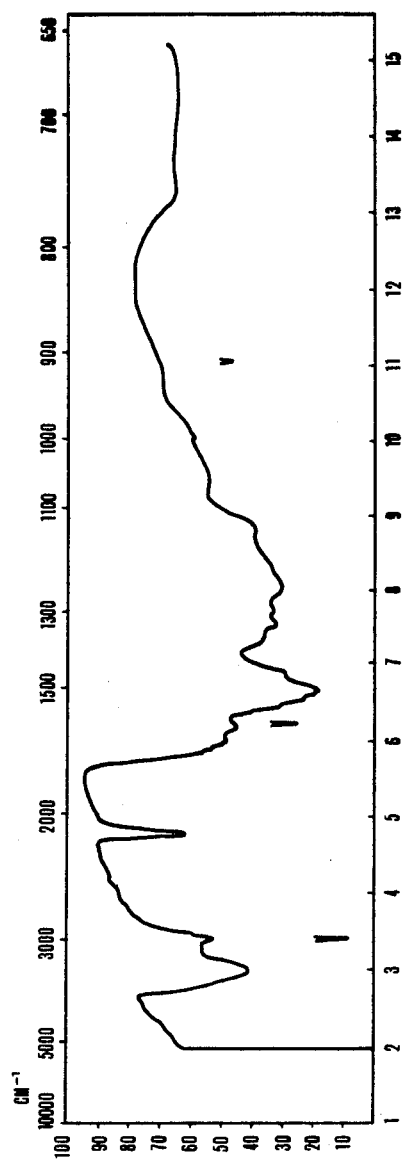
Figure 6:
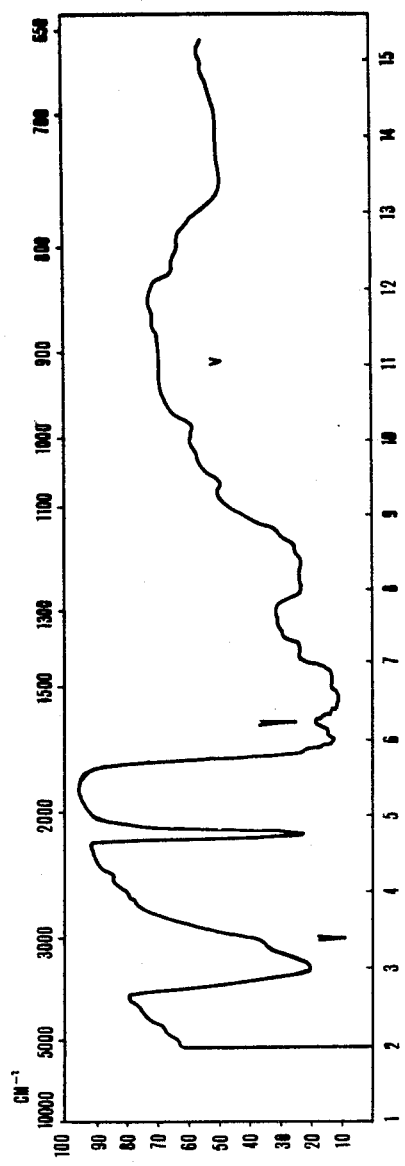

2: 100 part of the prepolymer of viscous liquid was heated at 150°C for 7 hours in air and adsorbent (A'-1) was obtained and infrared spectra adsorption was shown in FIG. 5 and when the heating was carried out at 160°C for 7 hours, the resin showed infrared spectra of FIG. 6 and when the heating was at 140°C for 7 hours, the spectra adsorption was as FIG. 3.

Figure 4:
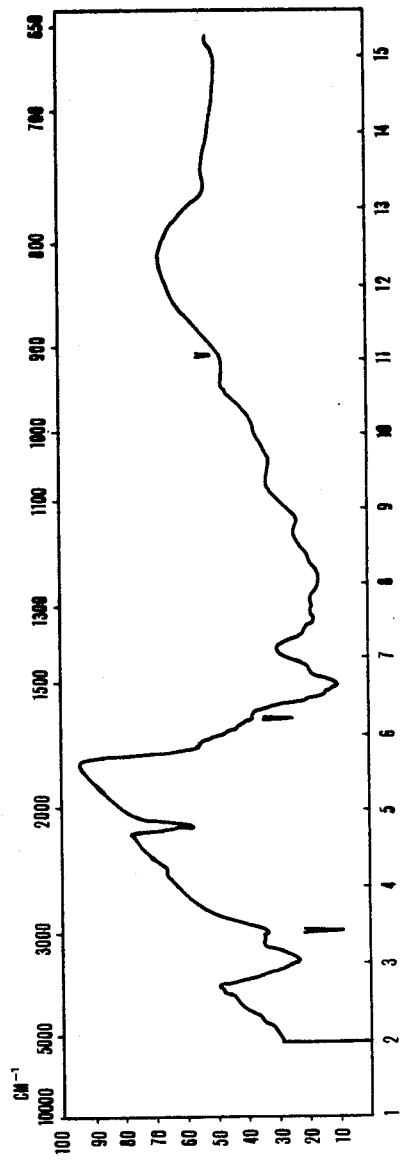

Another 100 parts of prepolymer of viscous liquid was heated at 100°C for 15 hours, and adsorbent (B'-1) obtained showed the infrared adsorption as shown FIG. 4.

Treatment with acid:

Each adsorbent was milled to 10–40 mesh and was respectively dipped in 1N Of hydrochloric acid solution for 24 hours and rinsed with water to show pH 3 of rinsing water and centrifuged.

Adsorption test:

1.0grs. in dry base of each adsorbent was added in 1000ml of a waste water from electrolysis plant of NaCl by mercury cell, containing 3.5ppm of Hg corresponding to metallic mercury and the mixture was stirred for 7 hours and the concentration of the mercury in the waste water treated was measured by emission spectro analysis and the adsorption equilibrium at 0.3ppm was measured. The results were as follows;

adsorbent (A-1) : 0.15ppm adsorption equilibrium was 4.7mg/g
adsorbent (B-1) : 0.16ppm
adsorption equilibrium was 1.8mg/g The same test was repeated for aqueous mercuric chloride solution containing 10ppm of Hg corresponding to metallic mercury instead of the waste water.

The results were as follows:
adsorbent (A-1) : 0.16ppm
adsorption equilibrium was 15mg/g
adsorbent (B-1) : 0.68ppm
adsorption equilibrium was 5mg/g
adsorbent (A'-1): 0.22ppm
adsorbent (B'-1): 0.76ppm

EXAMPLE 2

Preparation of resin:

205 parts of thiourea, 280 parts of water, 487 parts of 37% aqueous solution of formaldehyde and 38 parts of melamine were mixed and 1.5ml of 5N aqueous solution of potassium hydroxide and 10% of ammonia water were added and the pH of the mixture was adjusted to 7.8–8.0 and then, the mixture was reacted at a temperature of 80° to 90°C for 90 minutes and prepolymer of viscous liquid was obtained.

1: 100 parts of prepolymer of viscous liquid was sprayed homogeneously on 145 parts of diatomaccous earth which was degassed by a previous heating. One half of the diatomaceous earth containing the reaction mixture was dried and heated at 150°C for 7 hours in air and adsorbent (A-2) was obtained. The other half of the diatomaceous earth containing the reaction mixture was dried at 100°C for 15 hours in air and adsorbent (B-2) was obtained.

Figure 7:
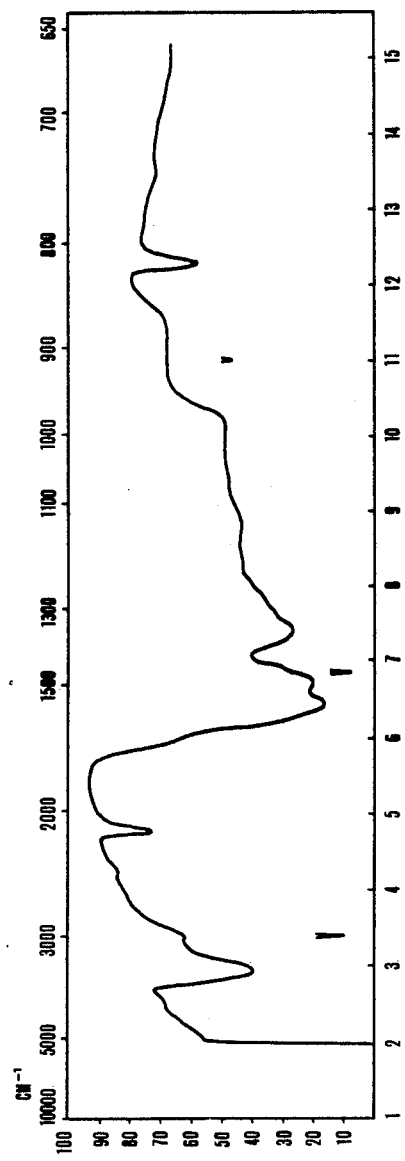
Figure 8:
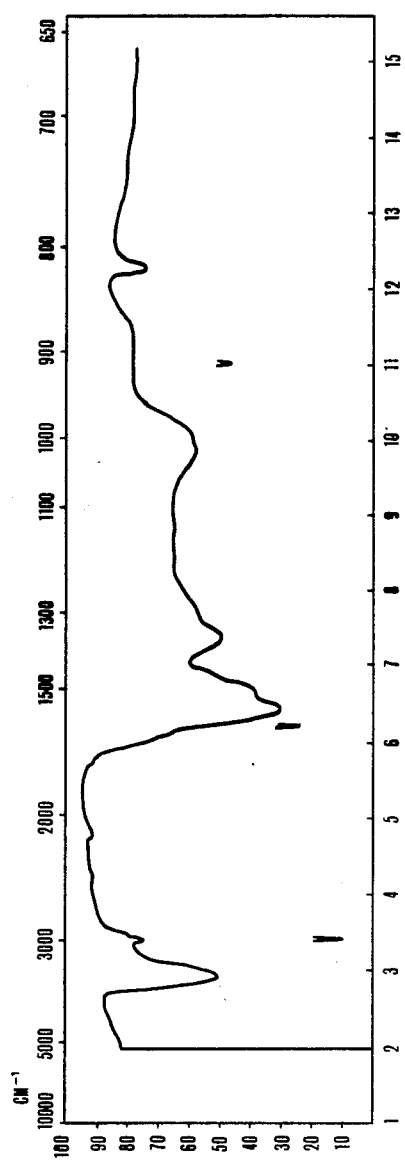

2: 100 parts of the prepolymer of viscous liquid was vigorously stirred under bubbling air and the viscous liquid was heated at 150°C for about 5 hours and a pale yellow form of adsorbent (A'-2) having strong infrared spectrum absorption at $4.79\mu$ as shown FIG. 7 was obtained. On the other hand, 100 parts of the viscous liquid was treated as said above at 100°C for 15 hours and a white form of adsorbent (B'-2) not having infrared spectrum absorption at $4.79\mu$ as shown in FIG. 8 was obtained.

Treatment with acid:

Adsorbents obtained were milled to granules having 20–40 mesh particle size, dipped in 1N of hydrochloric acid for 24 hours, rinsed with water and centrifuged.

Adsorption test:

1.0grs. of each adsorbent was added in 100ml of aqueous solution of mercuric chloride containing 10ppm of Hg corresponding to metallic mercury and the mixture was stirred for 7 hours and the condensation of the mercury in aqueous solution was measured by emission spectra analysis and adsorption equilibrium at 0.3ppm was measured.

The results were as follows;
adsorbent
A-2 : 0.09 ppm
adsorption equilibrium 25mg/g
B-2 : 0.18 ppm
adsorption equilibrium 14mg/g
A'-2 : 0.11 ppm
adsorption equilibrium 22mg/g
B'-2 : 0.23 ppm
adsorption equilibrium 11mg/g

EXAMPLE 3

Preparation of resin 110 parts of thiourea were mixed with 470 parts of water and then 260 parts of 37% aqueous solution of formaldehyde and 15 parts of phenol were added and dissolved in the mixture. Further, after being neutralized with 10% ammonia water, and 1.6 parts of 20% aqueous solution of potassium hydroxide, the mixture was reacted at 91°–94°C for 60 minutes. Just before the occurance of white turbidity in the reaction mixture of the prepolymer, the mixture was sprayed homogeneously on 1000 parts of granules of diatomaceous earth having 10–40 mesh (Tyler) which was dried and degassed by a previous heating.

Half of the diatomaceous earth containing the reaction mixture was tried and heated at 150°C for 7 hours in air and adsorbent (A'-3) was obtained.

The other half of the diatomaceous earth containing the reaction mixture was dried at 100°C for 4 hours and at 120°C for 5 hours and adsorbent (B'-3) was obtained.

These adsorbents (A'-3) and (B'-3) were respectively dipped in 1.0N, 5.0N or 10.0N of various kind of acid such as HCl, $H_2NO_3$, $H_2SO_4$ and $HClO_4$ for 24 hours at a rate of 3grs. of adsorbent to 50ml of acid and rinsed to rinsing water having pH 6–7 and each treated adsorbent was obtained.

Adsorption test:

1.0grs. of each adsorbent was added and stirred for 24 hours with 1000ml of waste water from an electrolysis plant of NaCl by mercury cell, containing 2.6ppm of Hg corresponding to metallic mercury at a pH of 3 and the concentration of the mercury was measured by emission spectro analysis and the removal rate of mercury was calculated.

The results were listed as follows;

residual mercury concentration ppm (removal rate %)

| acid | 1N | 5N | 10N | untreated* |
|---|---|---|---|---|
| | | adsorbent (B-3) | | |
| HCl | 1.5(42%) | 0.48(81%) | 0.21(92%) | 1.7(35%) |
| HNO₃ | 0.7(73) | — | — | '' |
| H₂SO₄ | 1.4(46) | 0.80(69) | 0.48(82) | '' |
| HClO₄ | 1.1(58) | 0.50(81) | 0.37(87) | '' |
| | | adsorbent (A-3) | | |
| HCl | 0.72(72) | 0.23(91) | 0.1(96.1) | 0.8(69) |
| HNO₃ | 0.45(83) | — | — | '' |
| H₂SO₄ | 0.66(75) | 0.43(84) | 0.22(92) | '' |
| HClO₄ | 0.61(77) | 0.32(88) | 0.28(89) | '' |

Note: *The adsorbent was not treated with acid solution.

EXAMPLE 4

Preparation of resin:

38 parts of thiourea were mixed with 30 parts of water and then 81 parts of a 37% aqueous solution of formaldehyde was added and dissolved in the mixture. Further, 1.5ml of 5N aqueous solution of potassium hydroxide and 10% of ammonia water were added and the pH Of the mixture was adjusted to 8.0. Then the mixture was reacted at a temperature of 70° to 80°C for 90 minutes and prepolymer of viscous liquid was obtained.

1. Fifty parts of the reaction mixture was sprayed homogeneously on 71 parts of granules of diatomaceous earth having 10–40 mesh (Tyler) which was dried and degassed by a previous heating, just before the occurance of white turbidity in the reaction mixture. Half of the diatomaceous earth containing the reaction mixture was dried and heated at 140°C for 8 hours in air and adsorbent (A-4) was obtained. The other half of the diatomaceous earth containing the reaction miixture was dried at 100°C for 15 hours in air and adsorbent (B-4) was obtained. Infrared spectra absorption was taken by KBr method and adsorbent (A-4) showed strong absorption at 4,79$\mu$(2088cm$^{-1}$), but adsorbent (B-4) did not show absorption at 4,79$\mu$.

2: 40 parts of the prepolymer of viscous liquid was heated at 145°C for 10 hours in air and adsorbent (A'-4) was obtained.

Figure 10:
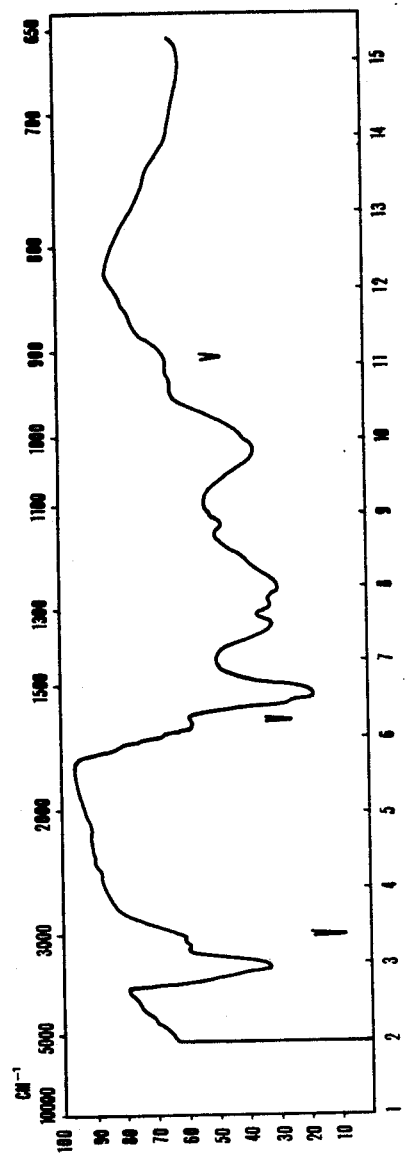

Another 40 parts of prepolymer of viscous liquid was heated at 100°C for 20 hours, adsorbent (B'-4) obtained showed the infrared adsorption as shown FIG. 10.

Treatment with acid:

Each adsorbent was milled to 10–40 mesh and was dipped in 8N of hydrochloric acid solution for 6 hours, and rinsed with water to show a pH Of 6 of rinsing water and centrifuged material.

Adsorption test:

30grs. of each adsorbent was packed in a glass tube having 15mm diameter and 50l of a waste water from an electrolysis plant of NaCl by a mercury cell containing 2.0ppm corresponding to metallic mercury at a pH3 was passed through the layer of the adsorbent in the glass tube at SV(space velocity) of 2.5 and the mercury concentration of the effluent water was measured.

Results were as follows.

| adsorbent | SV : 2.5 · 2.0PPM(Hg) · pH3· 50l |
|---|---|
| (A-4) | less than 0.005 ppm* |
| (A'-4) | 0.023 |
| (B-4) | 0.008 |
| (B'-4) | 0.046 |

Note: *The lower limitation of detection of mercury is 0.005ppm.

EXAMPLE 5

Preparation of resin:

80 parts of thiourea and 85 parts of urea were mixed with 600 parts of water and then 810 parts of 37% aqueous solution of formaldehyde were added and dissolved in the mixture. Further, 10% of ammonia water were added and the pH of the mixture was adjusted to about 8.0. Then the mixture was reacted at a temperature of 70° to 80°C for 90 minutes and prepolymer of viscous liquid was obtained.

1: One-hundred parts of the reaction mixture was sprayed homogeneously on 100 parts of granules of diatomaceous earth having 10–40 mesh (Tyler) which was dried and degassed by a previous heating, just before the occurance of white turbidity in the reaction mixture. A half of the diatomaceous earth containing the reaction mixture was dried and heated at 150°C for 7 hours in air and adsorbent (A-5) was obtained. The other half of the diatomaceous earth containing the reaction mixture was dried at 100°C for 15 hours in air and adsorbent (B-5) was obtained.

2: 100 part of the prepolymer of viscous liquid was heated at 150°C for 7 hours in air and adsorbent (A'-5) was obtained.

Figure 11:
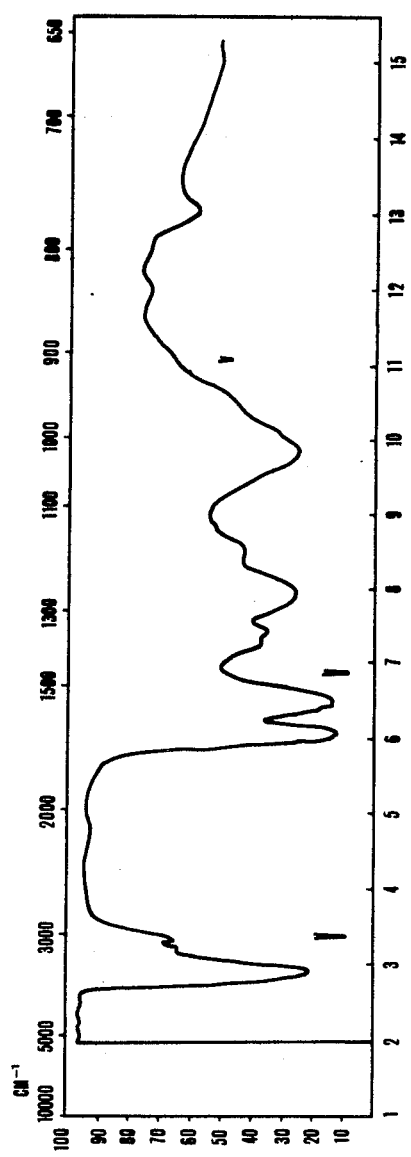

Another 100 parts of prepolymer of viscous liquid was heated at 100°C for 15 hours, adsorbent (B'-5) was obtained and infrared spectra adsorption is shown in FIG. 11.

Treatment with acid:

Each adsorbent was milled to 10–40 mesh and was respectively dipped in 1N of hydrochloric acid solution for 24 hours, and was rinsed with water to show pH 6 of rinsing water and centrifuged.

Adsorption test:

30grs. of each adsorbent were packed in a glass tube having 15mm diameter and containing 30l of mercuric chloride aqueous solution.

1.0ppm of mercury corresponding to metallic mercury at pH 7 was passed through the layer of the adsorbent in the glass tube at SV of 5. Mercury concentration of the effluent water was measured.

The results were shown as follows.

| adsorbent | SV : 5; 1.0PPM(Hg); pH7; 30l |
|---|---|
| A'–5 | less than 0.005 |
| B'–5 | 0.010 |
| A–5 | less than 0.005 |
| B–5 | 0.009 |

EXAMPLE 6

Preparation of resin:

85 parts of thiourea and 200 parts of urea were mixed with 600 parts of water and then 900 parts of 37% aqueous solution of formaldehyde and 38 parts of phenol were added and dissolved in the mixture. Further, 1.5ml of 5N aqueous solution of potassium hydroxide and 10% of ammonia water were added and the pH of the mixture was adjusted to 8.0. Then the mixture was reacted at a temperature of 70° to 80°C for 90 minutes and prepolymer of viscous liquid was obtained.

1: Fifty parts of the reaction mixture was sprayed homogeneously on 71 parts of granules of diatomaceous earth having 10–40 mesh (Tyler) which was dried and degassed by a previous heating, just before the occurance of white turbidity in the reaction mixture. A half of the diatomaceous earth containing the reaction mixture was dried and heated at 140°C for 8 hours in air and adsorbent (A-6) was obtained. The other half of the diatomaceous earth containing the reaction mixture was dried at 100°C for 15 hours in air and adsorbent (B-5) was obtained. Infrared spectra absorption was taken by KBr method and adsorbent (A-6) showed strong absorption at 4,79$\mu$(2088cm$^{-1}$), but adsorbent (B-6) did not show absorption at 4,79$\mu$.

2: 40 parts of the prepolymer of viscous liquid was heated at 145°C for 10 hours in and adsorbent (A'--6) was obtained.

Another 40 parts of prepolymer of viscous liquid was heated at 100°C for 20 hours, adsorbent (B'-6) was obtained.

Treatment with acid:

Each adsorbent was milled to 10–40 mesh and was respectively dipped in 8N of hydrochloric acid solution for 6 hours, and rinsed with water to show pH 6 of rinsing water and centrifuged.

Adsorption test:

The same test was repeated as shown in example 2 and similar results were obtained.

Chemical resistance was tested as follows: 30grs. of adsorbent was packed in a glass tube having 15mm in diameter and 10% $H_2SO_4$ aqueous solution was passed through the layer of the adsorbent for 20 days and it was confirmed that adsorbents obtained in this example 6 maintained good filtrability without deterioration of the resin, while the adsorbent obtained in example 5 deteriorate the filtrability.

EXAMPLE 7

The preparation of resin in example 6 was repeated except that 50 parts melamine were employed instead of 38 parts of phenol and adsorbents (A-7) and (B-7) impregnated in diatomaceous earth and heated at 140° mesh (Tyler), the adsorbents were dipped in 8N hydrochloric acid solution for 6 hours and rinsed with water. Then the adsorbents were tested for adsorption effects for copper, mercury, silver and cadmium.

Test method:

30grs. of each adsorbent was packed in a glass tube having 15mm in diameter and 30 litre of aqueous solution containing heavy metallic compound was passed at SV : 5 and content of metal in last 1 litre of effluent aqueous solution was estimated.

aqueous solution copper : 10PPM of $CuSO_4$ aqueous solution at pH3
mercury : 10PPM Of $HgCl_2$ aqueous solution at pH7
cadmium : 2PPM of $CdSO_4$ aqueous solution at pH8.5
silver : 10PPM of $AgNO_3$ aqueous solution at pH5.0

The results and adsorbents tested were shown as follows.

| Run | adsorbent raw material (parts) | | | carrier | content(%) $\left(\dfrac{resin}{carrier} \times 100\right)$ | adsorption effect concentration (PPM) | | | |
|---|---|---|---|---|---|---|---|---|---|
| | polyamides | aldehydes | aromatic compounds | | | Cu | Hg | Ag | Cd |
| adsorbent **** A-8 | thiourea (57) | formaldehyde 37% (243) | p-HBA.Na* (14.1) | diatomaceous earth | 10 | — | 0.05 | less than 0.01 | less than 0.01 |
| A-9 | thiourea (61) | furfural (173) | phenol (19) | activated carbon | 8 | — | less than 0.01 | " | — |
| A-10 | thiourea (76) | formaldehyde (162) | benzoic acid (12.4) | alumina | 12 | — | " | " | — |
| A-11 | rubeanic acid (96) | formaldehyde (162) | phenol (19) | zeolite | 15 | less than 0.02 | 0.02 | " | — |
| A-12 | melamine (38) thiourea (53) | acetaldehyde 40% (210) | — | diatom earth | 30 | — | less than 0.01 | " | — |
| A-13 | thiourea (60.8) | formaldehyde (162) | thiophenol** (25) | bentonite | 17 | — | 0.01 | " | less than 0.01 |
| A-14 | thiourea (53) | formaldehyde (162) | phenol (9.5) p-BSA*** (28) | diatomaceous earth | 25 | less than 0.02 | 0.04 | " | — |
| A-15 | thiourea (23) | formaldehyde (122) | — | silica gel | 5 | — | less than 0.01 | " | — |
| A-16 | thiourea (53) | formaldehyde (162) | 1-naphtal (29)** | zeolite | 25 | — | 0.02 | 0.01 | — |
| A-17 | thiourea (68) | formaldehyde (162) | aniline (9.4) | diatomaceous earth | 15 | — | 0.03 | less than 0.01 | — |
| A-18 | thiourea (68) | formaldehyde (162) | phenylhydrozine | coke | 15 | — | 0.04 | " | — |

Figure 9:
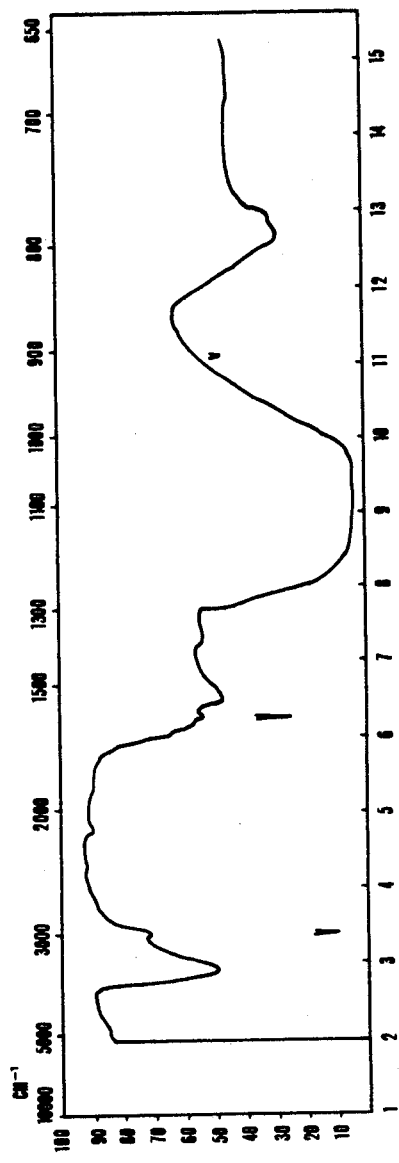

\* : p-hydroxybenzoic acid sodium salt
\*\* : 300 parts of methylethylketone solvent were used as a solvent
\*\*\* : p-hydroxybenzenesulfonate
\*\*\*\* : Infrared spectra is shown in FIG. 9 and 100°C and adsorbents (A'-7) and (B'-7) heated at 145° and 100°C were obtained.

The adsorption test and chemical resistance test in Example 6 was repeated and it was confirmed that the adsorbents obtained have good adsorption effect for mercury and have chemical resistance to acid.

EXAMPLE 8

Polyamine, aldehyde, and aromatic compounds desired, were reacted at 80° to 90°C for 1–2 hours and the prepolymer obtained was impregnated in a carrier and then heated at 150°C for 5 hours. After milling the adsorbents to granules having a particle size of 20–40

EXAMPLE 9

Composition for fixation of slurry or mud waste

Each of 0.1, 2.5, 5, and 25 parts of adsorbent (A-1) having about 100 mesh (Tyler) obtained in example 1 was mixed with 100 parts of Portland cement and compositions for fixation of mercury and copper from extraction by water were obtained.

Then the compositions were used for preparation of mortar and properties of the mortar and cement were tested. Results were shown as follows.

|     | composition (part) | | | bending strength (kg/cm²) | | compressive strength (kg/cm²) | |
| --- | --- | --- | --- | --- | --- | --- | --- |
|     | | | mortar | age (days) | | | |
| No. | adsorbent (A-1) | Portland cement | Sand | 7 | 28 | 7 | 28 |
| 1 | 0.1 | 100 | 100 | 43 | 66.2 | 190 | 348 |
| 2 | 2.5 | 100 | 100 | 47.9 | 65.1 | 240 | 385 |
| 3 | 5 | 100 | 100 | 48.1 | 69.0 | 270 | 375 |
| 4 | 25 | 100 | 100 | 44.6 | 70.0 | 249 | 384 |
| control | 0 | 100 | 100 | 43 | 66.2 | 190 | 348 |

It was confirmed that the adsorbent in cement did not deteriorate the properties of cement.

Fixation of mud containing mercury

Adsorbent (A-1) in example 1 or adsorbent (A-11) in example 8 was milled to powder and mixed with Portland cement and then the cement containing the adsorbent powder was mixed with slurry of mud by-produced from electrolysis plant of NaCl by mercury cell and with some water and the mixture was casted into a mould and solidified.

After 25 day from the casting, the solidified test pieces were dipped in water having four times the volume of the pieces and after 1 hour, 1 day, 14 day, 1 month and 3 months, the concentration of mercury extracting into water was determined.

The results and composition of the test piece were listed as follows.

EXAMPLE 10

50 grs. of each adsorbent having a particle size of 20–40 mesh (Tyler) was packed in a glass tube and 30l of aqueous solution containing Ag, Hg, Pb, Na, Ni, Mn, Cr, B, Co, As and Al in a concentration of 20ppm for each was passed through the layer of the adsorbent in the glass tube at SV=2, pH 5 and the concentration of metals in effluent aqueous solution were measured.

As a result, it was confirmed that all the adsorbents shown in example 1-8 adsorbed only Ag and Hg to such an extent that there was an Ag and Hg residue in a concentration of less than 0.01, however, other metals of Pb, Na, Ni, Mn, Cr, B, Co, As and Al could not be adsorbed.

EXAMPLE 11

Polyamine, aldehyde and aromatic compound were reacted at 80° to 90°C for 1–2 hours, and then the reaction temperature was gradually raised from 90° to 140°C for 8–10 hours.

The resins obtained were milled to powder. 5 parts of the powder adsorbents were mixed with 100 parts of Portland cement and cement compositions for fixing mercury were prepared.

100 parts of cement composition, 80 parts of mud containing mercury as shown in example 9 and 50 parts of water were mixed and the mud was solidified with the cement composition. The solidified test piece were dipped in water having four times as much as test piece volume.

After the 3 months of dipping, the concentration of mercury extracted in water was less than detectable concentrations of 0.005 ppm.

| test piece part** | | | | Hg content (PPM) in water | | | | |
| --- | --- | --- | --- | --- | --- | --- | --- | --- |
| composition for fixation | | | | after | | | | |
| adsorbent | cement | mud* | water | 1 hour | 1 day | 14 day | 1 month | 3 month |
| | | | | invention | | | | |
| (A-1) 50 | 100 | 100 | 50 | less than 0.005 | less than 0.005 | less than 0.005 | less than 0.005 | less than 0.005 |
| (A-1) 10 | 100 | 100 | 50 | ″ | ″ | ″ | ″ | ″ |
| (A-1) 1 | 100 | 100 | 50 | ″ | ″ | ″ | ″ | ″ |
| (A-1) 0.1 | 100 | 100 | 50 | ″ | ″ | ″ | ″ | ″ |
| (A-1) 50 | 100 | 500 | 100 | ″ | ″ | ″ | ″ | ″ |
| (A-1) 5. | 100 | 500 | 100 | ″ | ″ | ″ | ″ | ″ |
| (A-1) 0.5 | 100 | 500 | 100 | ″ | ″ | ″ | ″ | ″ |
| (A-11) 15 | 100 | 100 | 50 | ″ | ″ | ″ | ″ | ″ |
| | | | | control | | | | |
| — 0 | 100 | 100 | 50 | 0.019 | 0.035 | 0.064 | 0.090 | 0.11 |
| — 0 | 100 | 500 | 100 | 0.040 | 0.074 | 0.20 | 0.29 | 0.35 |

* mud contained 48 PPM of Hg corresponding to metallic mercury, NaCl 8.7%, Mg(OH)₂ 9.8%, Ca(SO₄).2H₂O 15.2%, CaCO₃ 23.1%, C 11.0% and water 32%
** 5cm (in diameter) × 10cm (in hight)

| adsorbent (raw material) | | | Portland cement | mud | extracted mercury after 3 4onths |
| --- | --- | --- | --- | --- | --- |
| polyamines | aldehyde | aromatic compound | | | |
| thiourea (30) urea (30) | formaldehyde (81) ″ | — — | 30 ″ | 100 ″ | 80 ″ | less than 0.005 ppm ″ |
| thiourea (20) urea (8.5) melamine (126) | ″ formaldehyde (243) | — | ″ | ″ | ″ | ″ |
| urea (48) | formaldehyde (162) | phenol (18.8) | ″ | ″ | ″ | ″ |
| urea (48) | ″ | thiophenol (18.8) | ″ | ″ | ″ | ″ |

We claim:

1. A powder cement composition for fixing heavy metals or heavy metallic compounds, which comprises 99.9 to 50% of cement and 0.1 to 50% of an adsorbent prepared by a reaction between an aldehyde and a polyamine selected from the group consisting of thiourea and rubeanic acid.

2. A composition as claimed in claim 1, wherein said aldehyde and polyamine are additionally reacted with an aromatic compound having at least one radical selected from the group consisting of —OH, —SH, —NH₂, —COOH and —COOMe (wherein Me represents sodium, potassium or a half atom of calcium).

3. A composition as claimed in claim 1 having therein a functional radical selected from the group consisting of

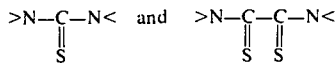

4. A composition as claimed in claim 1 having therein a functional radical selected from the group consisting of

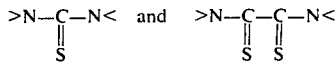

5. A cement composition for fixing metals or heavy metallic compounds, which comprises 99.9 to 50% of cement and 0.1 to 50% of an adsorbent comprising a carrier having more than cm²/g of specific surface and a resin at the ratio of 0.1 to 100% by weight of the carrier, wherein the resin is impregnated in the carrier and prepared by reacting an aldehyde and a polyamine selected from the group consisting of thiourea and rubeanic acid.

6. A composition as claimed in claim 5, wherein said aldehyde and polyamine are additionally reacted with an aromatic compound having at least one radical selected from the group consisting of —OH, —SH, —NH₂, —COOH and —COOMe (wherein Me represents sodium, potassium or a half atom of calcium).

7. A composition as claimed in claim 5 having therein a functional radical selected from the group consisting of

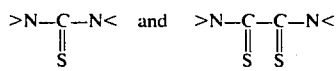

8. A composition as claimed in claim 6 having therein a functional radical selected from the group consisting of

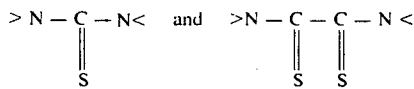

9. A powder cement composition for fixing heavy metals or heavy metallic compounds, which comprises 99.9 to 50% of cement and 0.1 to 50% of an adsorbent prepared by a reaction between an aldehyde and a polyamine compound selected from a group consisting of thiourea and rubeanic acid or an aldehyde, a polyamine compound selected from a group consisting of thiourea and rubeanic acid, and an aromatic compound having at least one radical selected from the group consisting of —OH, —SH, —NH₂, —COOH and —COOMe (wherein Me represents sodium, potassium or a half atom of calcium).

10. A powder cement composition for fixing metals or heavy metallic compounds, which comprises 99.9 to 50% of cement and 0.1 to 50% of an adsorbent comprising a carrier having more than cm²/g of specific surface and a resin at the ratio of 0.1 to 100% by weight of the carrier; wherein the resin is impregnated in the carrier and prepared by reacting an aldehyde and a polyamine selected from the group consisting of thiourea and rubeanic acid or an aldehyde, a polyamine selected from the group consisting of thiourea and rubeanic acid and an aromatic compound.

11. A composition claimed in claim 9 wherein the adsorbent is heated at a temperature higher than 130°C for more than 0.5 hours.

12. A composition claimed in claim 10, wherein the adsorbent is heated at a temperature higher than 130°C for more than 0.5 hours.

13. A composition claimed in claim 9, wherein the adsorbent is heated at from 140° to 200°C for from 1 to 10 hours.

14. A composition claimed in claim 10 wherein the adsorbent is heated at from 140° to 200°C for from 1 to 10 hours.

* * * * *